March 24, 1970 G. LOEWENBERG ET AL 3,502,284
MAGNETIC TAPE CARTRIDGE
Filed July 10, 1967
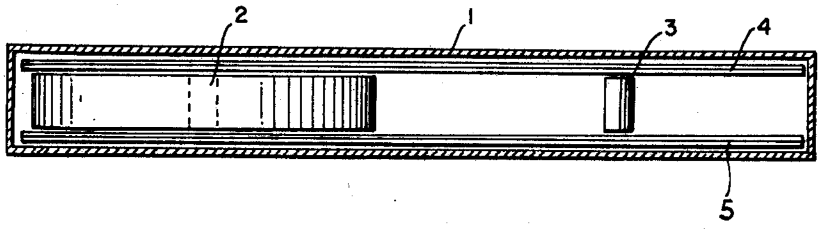
INVENTORS:
GUSTAV LOEWENBERG
ADOLF DIEBOLD
BY: Marzall, Johnston, Cook & Root
ATT'YS

United States Patent Office 3,502,284
Patented Mar. 24, 1970

3,502,284
MAGNETIC TAPE CARTRIDGE

Gustav Loewenberg and Adolf Diebold, Ludwigshafen (Rhine), Germany, assignors to Badische Anilin- & Soda-Fabrik Aktiengesellschaft, Ludwigshafen (Rhine), Germany Filed July 10, 1967, Ser. No. 652,192
Claims priority, application Germany, June 8, 1967, 1,270,298
Int. Cl. G11b *23/04*
U.S. Cl. 242—199 4 Claims

ABSTRACT OF THE DISCLOSURE

A magnetic tape cartridge having a top wall and a bottom wall between which a magnetic tape is adapted to be reeled. There is disposed on the interior surfaces of said walls a liner of plastic material, the side of the liner facing the tape being provided with a thin layer of a metal which is not affected by atmospheric influences.

Cartridges for magnetic tapes have recently become known which are easy to use in conjunction with specially developed machines and because of this are being commercially accepted on an ever increasing scale.

These magnetic tape cartridges consist of a flat rectangular casing made of plastic material in which a supply reel and a take-up reel are arranged. For operation the cartridge is merely inserted in a machine adapted to receive it without there being any need for one end of the tape to be threaded onto the take-up reel, as is the case with conventional machines. Openings are provided in one of the narrow walls of the cartridge which enable the magnetic tape in the interior of the casing to be brought into contact with the magnetic heads of the machine.

In order to reduce the size and weight of these cartridges, it is known that hubs may be used instead of the two reels, in which case the tape is guided by the walls of the cartridge. However, this embodiment has the disadvantage that friction between the tape and walls is comparatively high with the result that on the one hand the tape is damaged after prolonged periods of use and on the other hand the tape speed is altered, which impairs the quality of reproduction.

To overcome this disadvantage, U.S. Patent 3,027,110 proposes that a liner be disposed between the tape and the walls of the cartridge, which liner is made of a material that has a higher melting point than the material of which the cartridge is constructed and exhibits, in relation to the magnetic tape, a coefficient of sliding friction which is lower than that of the cartridge material in relation to the magnetic tape. Moreover, the material should not be too hard so as to eliminate annoying noises caused by friction between the liner and the magnetic tape as it travels in the cartridge. For this reason, only plastics, particularly polyesters, may be used as liner material according to the said patent. Cartridges provided with such liners substantially overcome the abovementioned disadvantages, but annoying noises often occur in operation. These are caused by static electrification brought about by friction between the magnetic tape and the liner.

It is an object of the present invention to provide an improved cartridge for magnetic tapes. It is a further object of the invention to provide a cartridge for magnetic tapes having a liner disposed between the tape and the top and bottom walls thereof, said cartridge having means for eliminating annoying noises occurring in operation caused by static electrification.

These objects are achieved by providing the side of the liner facing the magnetic tape with a thin layer of a metal which is not affected by atmospheric influences.

Such a metal is defined as one which in particular is not affected by the action of oxygen or moisture, such as nickel, cobalt, silver, copper or alloys thereof, or one which becomes passivated by the formation of an oxide film, such as aluminum or tin.

To achieve the desired object, it is sufficient to apply a layer of metal 0.1 to 2 microns in thickness to the liner. The liner may be made of any plastic material provided that is retains its dimensional stability at the temperatures occurring in the cartridge. Examples of such liners are sheets of polyesters, polyvinyl chloride, polycarbonates, polytetrafluoroethylene, polyamides, polymethanes and polyolefins.

Surprisingly, the use according to this invention of such metallized sheets in magnetic tape cartridges prevents not only the annoying noises caused by electric charges, although the cartridge is made of plastic and as a result these charges are not carried off, but also those which are usually brought about by friction between the tape and a harder surface.

The invention is further illustrated by the accompanying drawing which shows by way of example a sectional view of a magnetic tape cartridge according to this invention consisting of a casing 1, two hubs 2 and 3, the tape in the present case being wound around hub 2, and liners 4 and 5 coated with a layer of metal which faces the magnetic tape.

We claim:

1. In a magnetic tape cartridge in which a liner of plastic material is disposed between the top and bottom walls of the cartridge and the magnetic tape for frictional contact of said liner with said tape, the improvement which comprises a thin layer of metal resistant to atmospheric oxygen and moisture applied onto the side of the liner facing the tape.

2. A magnetic tape cartridge as claimed in claim 1 wherein said layer of metal consists of nickel, copper, cobalt, silver or alloys thereof.

3. A magnetic tape cartridge as claimed in claim 1 wherein said layer of metal consists of aluminum or tin.

4. A magnetic tape cartridge as claimed in claim 1 wherein said layer of metal has a thickness of 0.1 to 2 microns.

References Cited

UNITED STATES PATENTS

| | | | |
|---|---|---|---|
| 2,734,007 | 2/1956 | Toulmin | 317—2 X |
| 2,889,491 | 6/1959 | MacDonald | 317—2 |
| 3,027,110 | 3/1962 | Andrews | 242—55.13 |
| 3,059,870 | 10/1962 | Hall et al. | |
| 3,062,464 | 11/1962 | Moose et al. | |
| 3,094,436 | 6/1963 | Schroder | 317—2 X |
| 3,137,806 | 6/1964 | Schweriner | 317—2 |

GEORGE F. MAUTZ, Primary Examiner

U.S. Cl. X.R.

317—2